(12) United States Patent
Shin

(10) Patent No.: US 8,185,123 B2
(45) Date of Patent: May 22, 2012

(54) METHOD AND APPARATUS FOR MANAGING RADIO RESOURCES IN MOBILE COMMUNICATION SYSTEM

(75) Inventor: Sang-Min Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1181 days.

(21) Appl. No.: 11/775,712

(22) Filed: Jul. 10, 2007

(65) Prior Publication Data

US 2008/0026766 A1    Jan. 31, 2008

(30) Foreign Application Priority Data

Jul. 31, 2006 (KR) .............................. 2006-0071958

(51) Int. Cl.
*H04W 72/00* (2009.01)
*H04L 12/26* (2006.01)

(52) U.S. Cl. ..... 455/450; 370/252; 370/444; 455/414.2; 455/512

(58) Field of Classification Search .................. None
See application file for complete search history.

(56) References Cited

U.S. PATENT DOCUMENTS

| | | | |
|---|---|---|---|
| 6,112,101 A * | 8/2000 | Bhatia et al. .................. | 455/512 |
| 6,728,215 B1 * | 4/2004 | Alperovich et al. .......... | 370/252 |
| 6,973,062 B1 * | 12/2005 | Han .............................. | 370/335 |
| 2003/0103520 A1 * | 6/2003 | Chen et al. .................... | 370/444 |
| 2004/0185866 A1 | 9/2004 | Terry et al. | |
| 2006/0030303 A1 * | 2/2006 | Albertsson et al. ......... | 455/414.2 |
| 2006/0035634 A1 * | 2/2006 | Swann et al. ................. | 455/425 |

FOREIGN PATENT DOCUMENTS

| | | |
|---|---|---|
| JP | 2005-86588 | 3/2005 |
| KR | 100258688 | 3/2000 |
| KR | 1020000015269 | 3/2000 |
| KR | 1020010019047 | 3/2001 |
| KR | 1020030042390 | 5/2003 |
| KR | 1020050022988 | 3/2005 |

* cited by examiner

*Primary Examiner* — Jinsong Hu
*Assistant Examiner* — William Nealon
(74) *Attorney, Agent, or Firm* — The Farrell Law Firm, P.C.

(57) ABSTRACT

Provided is a method and apparatus for managing radio resources in a mobile communication system. The method includes periodically detecting a current radio resource availability state within a cell, and broadcasting information about the current radio resource availability state to a mobile terminal.

11 Claims, 6 Drawing Sheets

| VALUE | RADIO RESOURCE AVAILABILITY LEVEL |
|---|---|
| 000 | AVAILABLE TO ALL LEVELS |
| 001 | TEMPORARILY UNAVAILABLE TO LEVEL D |
| 010 | TEMPORARILY UNAVAILABLE TO LEVELS OF C OR LOWER |
| 011 | TEMPORARILY UNAVAILABLE TO LEVELS OF B OR LOWER |
| 100 | TEMPORARILY UNAVAILABLE TO LEVELS OF A OR LOWER |

| VALUE | RADIO RESOURCE AVAILABILITY LEVEL |
|---|---|
| 000 | AVAILABLE TO ALL LEVELS |
| 001 | TEMPORARILY UNAVAILABLE TO LEVEL D |
| 010 | TEMPORARILY UNAVAILABLE TO LEVELS OF C OR LOWER |
| 011 | TEMPORARILY UNAVAILABLE TO LEVELS OF B OR LOWER |
| 100 | TEMPORARILY UNAVAILABLE TO LEVELS OF A OR LOWER |

FIG.6

METHOD AND APPARATUS FOR MANAGING RADIO RESOURCES IN MOBILE COMMUNICATION SYSTEM

PRIORITY

This application claims priority under 35 U.S.C. §119 to an application filed in the Korean Intellectual Property Office on Jul. 31, 2006 and allocated Ser. No. 2006-71958, the contents of which are incorporated herein by reference.

BACKGROUND OF THE INVENTION

1. Field of the Invention

The present invention relates generally to a method and apparatus for managing radio resources in a mobile communication system, and more particularly, to a method and apparatus for periodically transmitting information about the availability of radio resources for a current network from a base station to a mobile terminal, thereby allocating the radio resources efficiently.

2. Description of the Related Art

FIG. 1 illustrates a radio resource allocation procedure between a base station and a mobile terminal in a conventional mobile communication system.

Referring to FIG. 1, for call establishment, a mobile terminal 100 transmits a Packet Channel Request to a base station 102 via a Random Access Channel (RACH) to request allocation of radio resources (step 110).

When the base station 102 is capable of allocating radio resources to the mobile terminal 100, the base station 102 transmits a Packet Uplink Assignment to the mobile terminal 100 to allocate radio resources to the mobile terminal 100 (step 118).

However, when the base station 102 is busy and hence there are no radio resources available to the mobile terminal 100, the base station 102 transmits a Packet Queuing Notification to the mobile station to request the mobile station to wait temporarily (step 112).

Thereafter, when a Timing Advance (TA) calculated by the base station 102 at the receipt of the radio resource allocation request changes due to the movement of the mobile terminal 100, the base station 102 transmits a Packet Polling Request to the mobile terminal 100 to update the TA (step 114). Upon receipt of the Packet Polling Request, the mobile terminal 100 transmits a Packet Control Acknowledgement to the base station 102 (step 116). The TA update process may be performed depending on the type of a base station.

When the network state of the base station 102 becomes capable of allocating radio resources to the mobile terminal 100, the base station 102 transmits the Packet Uplink Assignment to the mobile terminal 100 to allocate radio resources to the mobile terminal 100 (step 118).

As described above, the mobile terminal of the conventional mobile communication system does not know about the availability state of radio resources. Therefore, although the base station is busy and hence there are no radio resources available to the mobile terminal, the mobile terminal requests the base station to allocate radio resources via the RACH, which increases a network load. Moreover, there is a high probability that the RACH used by the mobile terminal for the radio resource allocation request is transmitted with the same random number and on the same frame as another RACH that can be normally processed by the base station, causing a collision between the respective RACHs. In addition, there is a case where the mobile terminal transmits a resource allocation request to a base station, which does not perform the TA update process, receives a temporary wait request from the base station, and is then allocated radio resources after long-distance movement. In this case, the TA information changes and thus a collision occurs against a burst using an adjacent time slot during uplink transmission, which necessitates the mobile terminal to restart the resource request process.

SUMMARY OF THE INVENTION

An object of the present invention is to substantially solve at least the above problems and/or disadvantages and to provide at least the advantages below. Accordingly, an object of the present invention is to provide a method and apparatus for managing radio resources in a mobile communication system.

An object of the present invention is to provide a method and apparatus for minimizing unnecessary network connection during allocation of radio resources in a mobile communication system.

An object of the present invention is to provide a method and apparatus for transmitting the availability of radio resources from a base station to a mobile station in a mobile communication system, thereby preventing unnecessary network connection.

An object of the present invention is to provide a method and apparatus for blocking radio resource allocation requests of some users in a mobile communication system, thereby providing a stable service to the existing users who have been allocated radio resources.

According to an aspect of the present invention, a method for managing radio resources at a base station includes periodically detecting a current radio resource availability state within a cell, and broadcasting information about the current radio resource availability state to a mobile terminal.

According to an aspect of the present invention, a method for managing radio resources at a mobile terminal includes upon receipt of current radio resource availability state information from a base station, detecting the received radio resource availability state information to determine whether the radio resources are available to the mobile terminal, and informing a user of the possibility of a mobile origination call and a packet switching service depending on the availability of the radio resources.

According to an aspect of the present invention, an apparatus for managing radio resources at a base station includes a network state determiner for periodically detecting a current radio resource availability state within a cell to determine a radio resource availability level of a mobile terminal, and a communication module for broadcasting the determined radio resource availability level to the mobile terminal.

According to an aspect of the present invention, an apparatus for managing radio resources at a mobile terminal includes a communication module for receiving radio resource availability level information of the mobile terminal from a base station, a controller for comparing the received radio resource availability level with an actual level of the mobile terminal to determine whether the radio resources are available to the mobile terminal, and a display unit for displaying the possibility of a mobile origination call and a packet switching service depending on the determination results.

BRIEF DESCRIPTION OF THE DRAWINGS

The above and other objects, features and advantages of the present invention will become more apparent from the following detailed description when taken in conjunction with the accompanying drawings in which:

FIG. 6 illustrates the resource availability levels of a mobile terminal depending on the states of radio resources in a mobile communication system according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention provides a method and apparatus for periodically transmitting information about the availability of radio resources for a network from a base station to a mobile terminal in a mobile communication system, thereby preventing unnecessary network connection and enabling the efficient management of radio resources.

Figure 1:
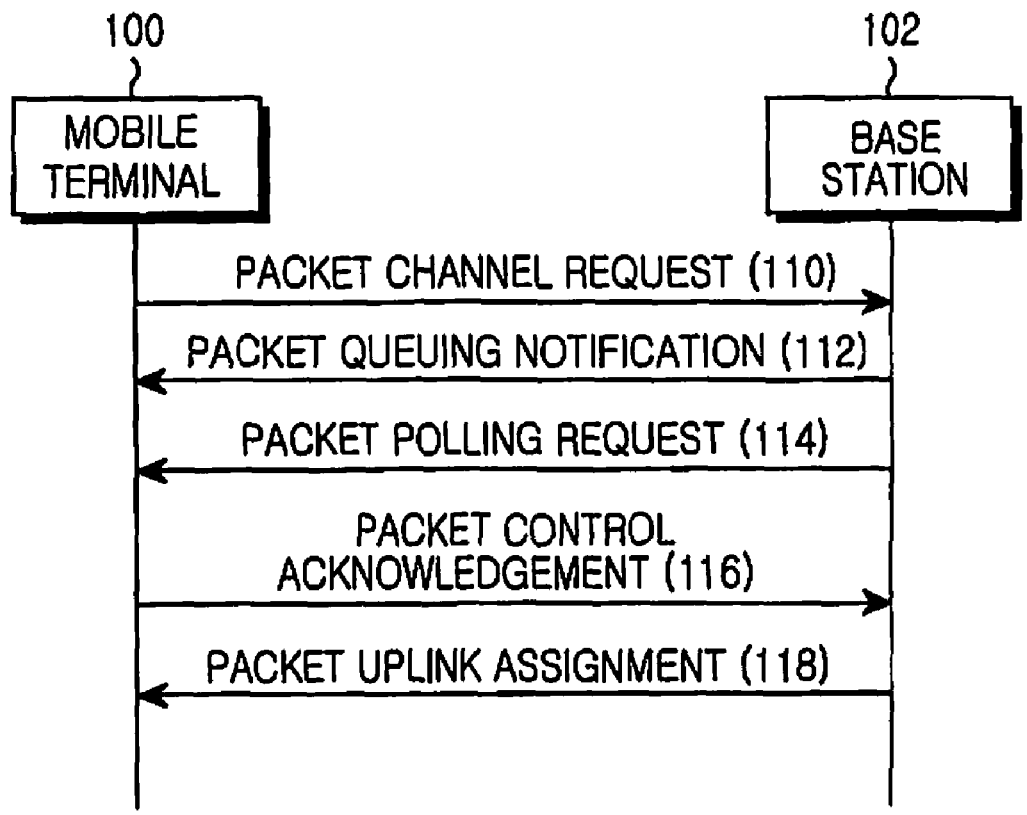
FIG. 1 illustrates a radio resource allocation procedure between a base station and a mobile terminal in a conventional mobile communication system.
Figure 2:
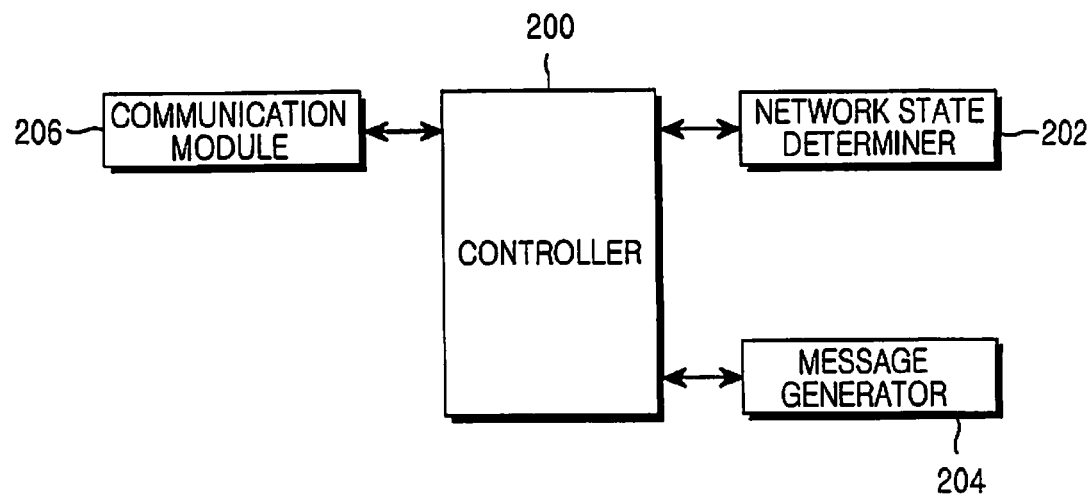
FIG. 2 illustrates a base station in a mobile communication system according to the present invention.

FIG. 2 illustrates a base station in a mobile communication system according to the present invention.

Referring to FIG. 2, the base station includes a controller 200, a network state determiner 202, a message generator 204 and a communication module 206.

The controller 200 controls and processes functions for providing a mobile communication service to a mobile communication subscriber and managing the session and mobility of the subscriber. According to the present invention, at set time intervals, the controller 200 requests the network state determiner 202 to determine the radio resource state of the current network and requests the message generator 204 to generate a system information message. Thereafter, the controller 200 requests the communication module 206 to transmit the system information message from the message generator 204 to all mobile terminals within a current cell.

Upon receipt of the radio resource state determination request from the controller 200, the network state determiner 202 determines an available (or allocatable) radio resource amount and an in-use radio resource amount in the current cell, determines a radio resource availability level of the mobile terminal according to the available radio resource amount, and outputs the radio resource availability level to the message generator 204. For example, a corresponding service provider may classify the radio resource availability levels of mobile terminals into levels A, B, C and D depending on the types of service subscription.

Under the control of the controller 200, the message generator 204 generates the system information message at the set time intervals. In addition, upon receipt of the radio resource availability level of the mobile terminal from the network state determiner 202, the message generator 204 adds a radio resource information value corresponding to the received availability level to the system information message and outputs the resulting system information message to the controller 200. The radio resource information value may be expressed in 3-bit value as illustrated in FIG. 6.

The communication module 206 Transmit/Receive (TX/RX)-processes Radio-Frequency (RF) signals transmitted/received through an antenna. For example, the communication module 206 converts a baseband signal, which is obtained by performing channel coding and spreading on data to be transmitted, into an RF signal that it transmits through the antenna. In addition, the communication module 206 converts a received RF signal into a baseband signal and performs despreading and channel decoding on the baseband signal to recover original data. In particular, according to the present invention, the communication module 206 broadcasts the system information message from the controller 200 at the set time intervals.

Figure 3:
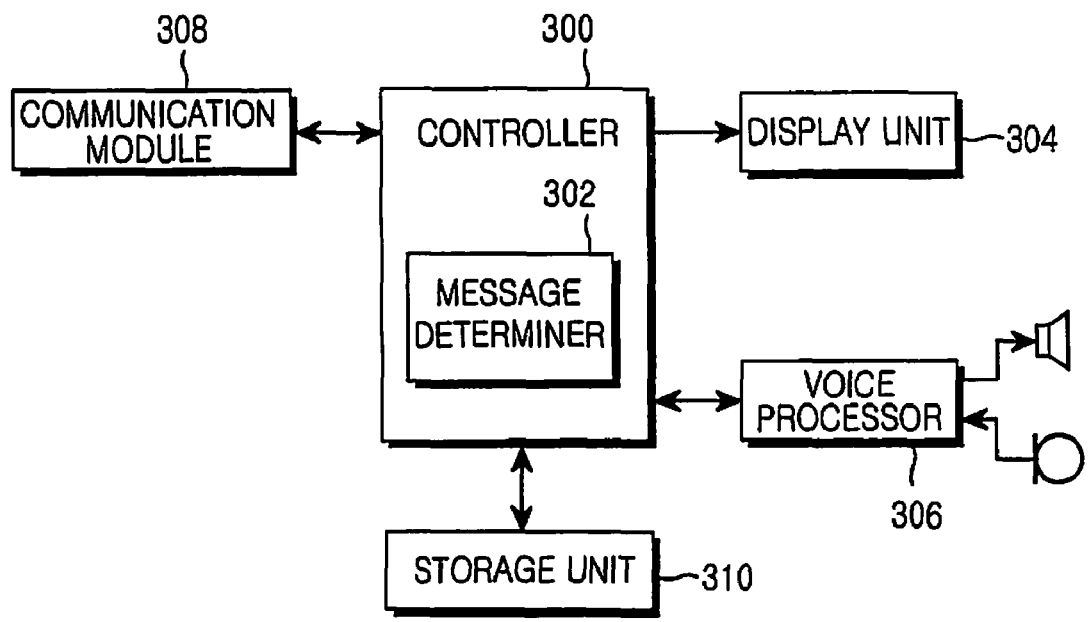
FIG. 3 illustrates a mobile terminal in a mobile communication system according to the present invention.

FIG. 3 illustrates a mobile terminal in a mobile communication system according to the present invention.

Referring to FIG. 3, the mobile terminal includes a controller 300, a message determiner 302, a display unit 304, a voice processor 306, a communication module 308 and a storage unit 310.

The controller 300 controls an overall operation of the mobile terminal, such as voice and data communication. The controller 300 includes the message determiner 302. Upon receipt of a system information message from the communication module 308, the controller 300 reads radio resource information from the storage unit 310, analyzes a bit value of radio resource information contained in the received system information message on the basis of the read radio resource information to detect the radio resource availability level of the mobile terminal capable of using the radio resources of the current network, and determines whether the mobile terminal is capable using radio resources. When the mobile terminal is incapable of using radio resources, the controller 300 is incapable of being allocated radio resources and thus informs a user of the impossibility of a Mobile Origination (MO) call and a packet switching service via the display unit 304 and the voice processor 306. When the mobile terminal is capable of using radio resources, the controller 300 informs the user of the possibility of the MO call and the packet switching service via the display unit 304 and the voice processor 306. In addition, when the MO call and the packet switching service are attempted by the user's key control while the radio resources are unavailable, the controller 300 prohibits the corresponding network connection.

The display unit 304 displays a set number of numerals and characters and status information generated during an operation of the portable terminal. According to the present invention, under the control of the controller 300, the display unit 304 displays whether the mobile terminal can perform an MO call and a packet switching service.

The voice processor 306 is also called a voice CODEC (COder-DECoder). The voice processor 306 Input/Output (I/O)-processes voice signals through a speaker and a microphone connected thereto. For example, the voice processor 306 converts Pulse Code Modulation (PCM) data received from the controller 300 into analog audio signals that it outputs to the speaker. In addition, the voice processor 306 converts audio signals received from the microphone into PCM data that it provides to the controller 300. Under the control of the controller 300, the voice processor 306 outputs an audio signal indicating whether the mobile terminal can perform an MO call and a packet switching service.

The communication module 308 TX/RX-processes RF signals transmitted/received through an antenna. For example, the communication module 308 converts a baseband signal, which is obtained by performing channel coding and spreading on data to be transmitted, into an RF signal and transmits the RF signal through the antenna. In addition, the communication module 308 converts a received RF signal into a baseband signal and performs despreading and channel decoding on the baseband signal to recover original data. According to the present invention, the communication module 308 receives the system information message from the base station and provides the received system information message to the controller 300.

The storage unit 310 stores a radio resource information table which contains bit values indicating the radio resource availability states of a network and radio resource availability levels corresponding to the bit values, as illustrated in FIG. 6.

Figure 4:
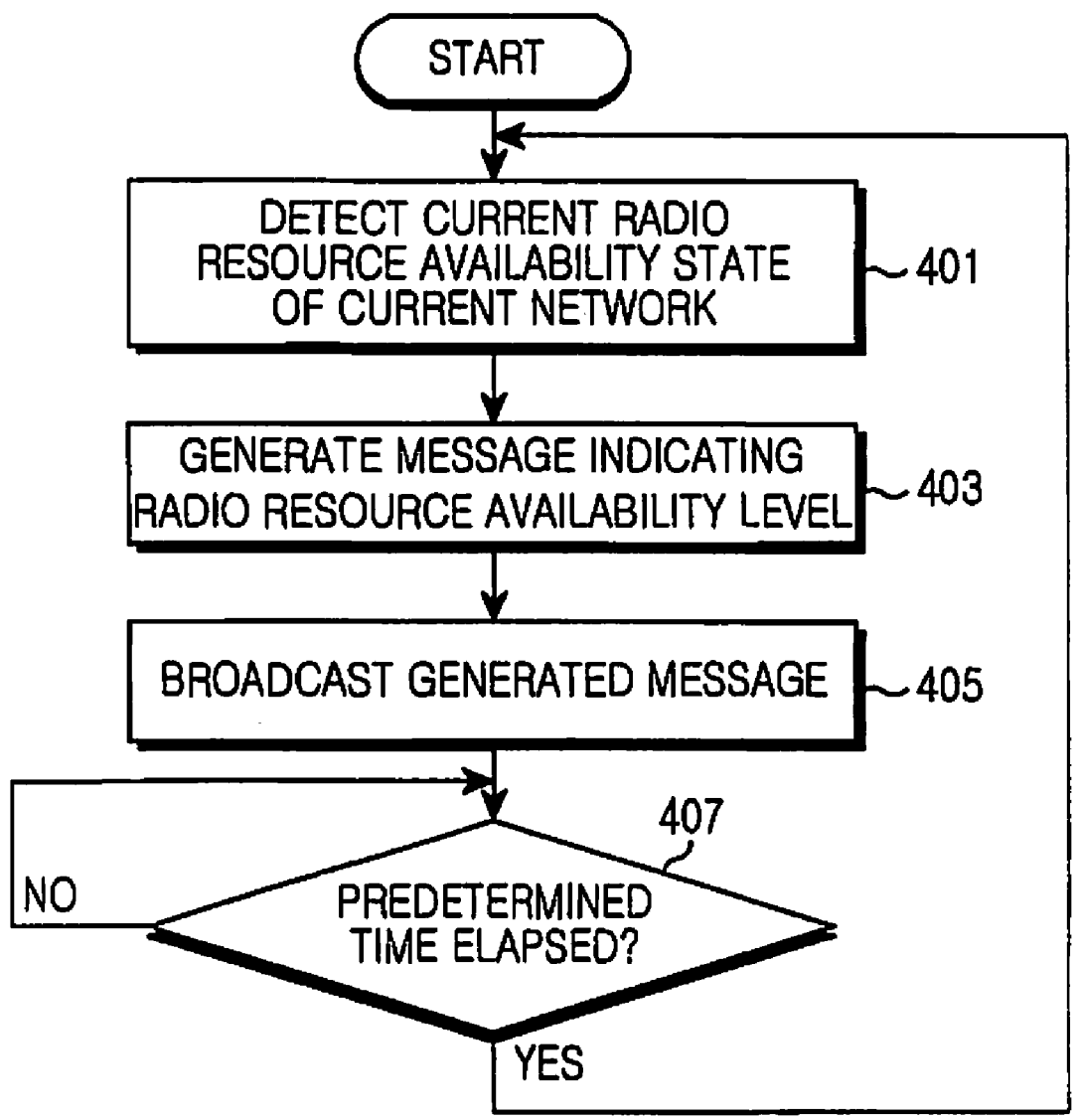
FIG. 4 illustrates a procedure for managing radio resources at a base station according to the present invention.

FIG. 4 illustrates a procedure for managing radio resources at a base station according to the present invention.

Referring to FIG. 4, the base station detects, in step 401, the current radio resource availability state of the current network (i.e., an in-use radio resource amount and an available radio resource amount).

In step 403, the base station determines a radio resource availability level of a mobile terminal on the basis of the detected available resource amount and generates a system information value containing a radio resource information value indicating the determined radio resource availability level. For example, when the available radio resource amount is small, the base station may generate a system information value with a radio resource information value of 100 so that a mobile terminal with a high priority order of a level A can use the radio resources, as illustrated in FIG. 6. When the available radio resource amount is large, the base station may generate a system information value with a radio resource information value of 000 so that mobile terminals of all levels can use the radio resources.

In step 405, the base station broadcasts the generated system information message to transmit the same to mobile terminals within the current cell.

In step 407, the base station determines whether a predetermined amount of time has elapsed. If so, the procedure returns to step 401; and if not, the procedure repeats step 407.

Figure 5:
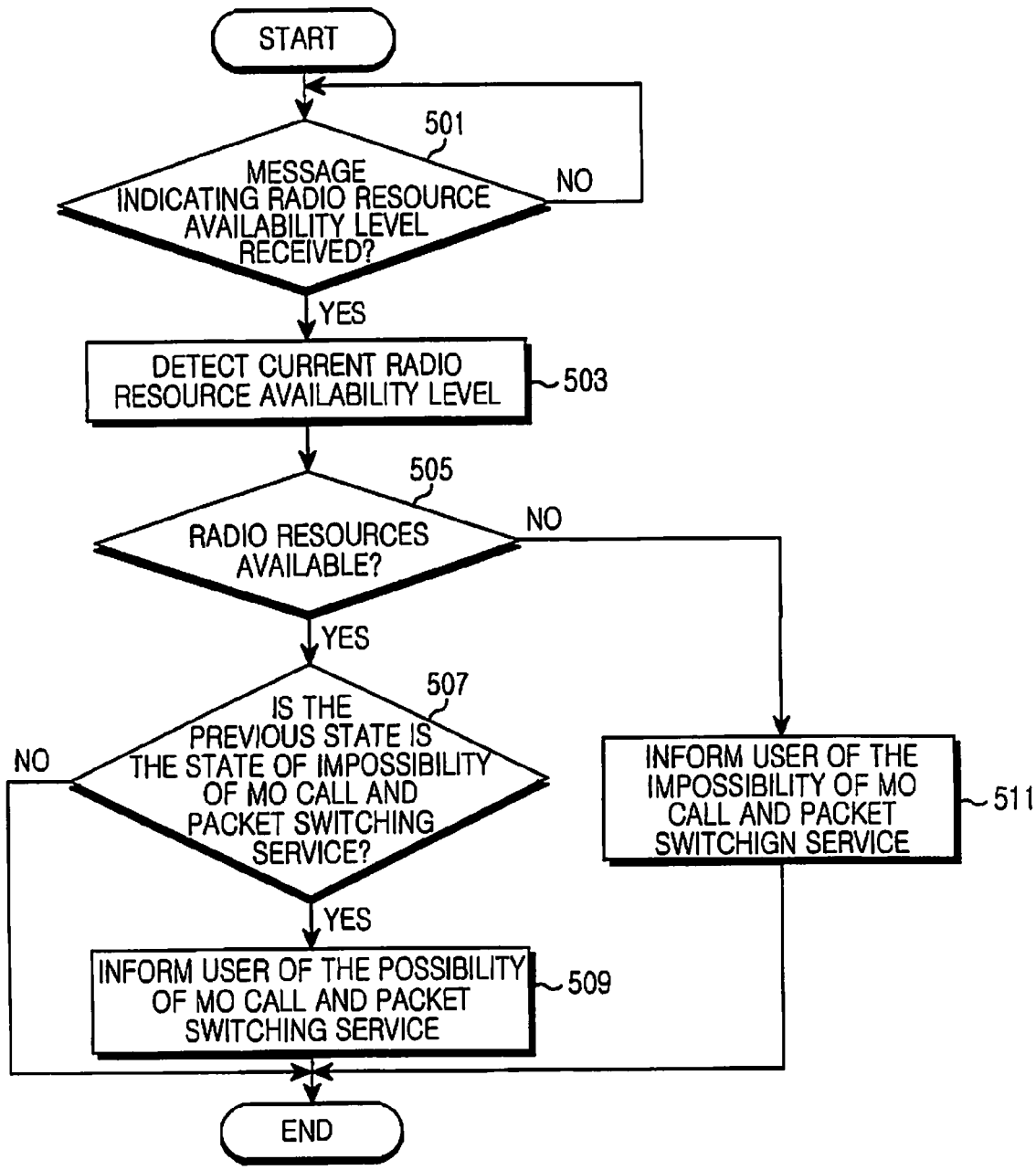
FIG. 5 illustrates a procedure for informing a user of the availability of radio resources at a mobile terminal according to the present invention.

FIG. 5 illustrates a procedure for informing a user of the availability of radio resources at a mobile terminal according to the present invention.

Referring to FIG. 5, the mobile terminal determines, in step 501, whether a system information message indicating a radio resource availability level is received from a base station. Upon receipt of the system information message, the mobile terminal detects a radio resource information value contained in the system information message to detect the current radio resource availability level in step 503. For example, in a mobile communication system with a radio resource information table illustrated in FIG. 6, when the radio resource information value contained in the system information message is '010', mobile terminals with levels of C or lower are incapable of using radio resources and mobile terminals with levels of A and B are capable of using the radio resources.

In step 505, the mobile terminal determines whether its own level belongs to the radio resource available level and thus it is capable of using the radio resources. If so, the procedure proceeds to step 507, and if not, the procedure proceeds to step 511.

In step 511, the mobile terminal informs a user of the impossibility of an MO call and a packet switching service via the display unit 304 and the voice processor 306. In addition, even when the MO call and the packet switching service are attempted by the user's key control, the mobile terminal controls the corresponding Internet connection not to be performed. For example, when a mobile terminal with a level D receives a system information message with a radio resource information value of 001, the mobile terminal with the level D is incapable of using radio resources and thus the mobile terminal displays an icon or message on the display unit 304 to inform the user of the impossibility of the MO call and the packet switching service. Thereafter, the procedure is ended.

When the impossibility of the MO call and the packet switching service continues, that is, information indicating the unavailability of radio resources is received continuously over a time specified by a network operator, the mobile terminal automatically performs a cell reselection.

However, in step 507, the mobile terminal determines whether the previous state is the impossibility of the MO call and the packet switching service. If not (i.e., the previous state is the possibility of the MO call and the packet switching service), the procedure is ended because of no change in the state, and if so, the procedure proceeds to step 509.

In step 509, the mobile terminal informs the user of the possibility of the MO call and the packet switching service via the display unit 304 and the voice processor 306. Thereafter, the procedure is ended.

It has been described that the base station determines the radio resource availability level of the mobile terminal on the basis of the current radio resource availability state and broadcasts the determined radio resource availability level to the mobile terminal. Alternatively, the mobile terminal may prestore information about the radio resource availability level depending on the current radio resource availability state (e.g., the available radio resource amount). In this case, the base station broadcasts only the current radio resource availability state, and the mobile terminal determines its radio resource availability level on the basis of the current radio resource availability state received from the base station to determine whether it can be allocated the radio resources.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for managing radio resources at a mobile terminal, comprising:
  a communication module for receiving a radio resource availability level from a base station;
  a controller for comparing the received radio resource availability level with an actual level of the mobile terminal to determine whether the radio resources are available to the mobile terminal; and a display unit for displaying a possibility of a mobile origination call and a packet switching service depending on the determination results, wherein the actual level of the mobile terminal is classified depending on types of service subscriptions, and wherein the mobile terminal performs cell reselection when the availability level indicating an unavailability of radio resources is received continuously over a time specified by a network operator.

2. The apparatus of claim 1, further comprising a voice processor for outputting a voice message informing the possibility of the mobile origination call and the packet switching service depending on the determination results.

3. The apparatus of claim 1, wherein the radio resource availability level is included in a periodically-broadcasted system information message.

4. A mobile terminal for managing radio resources, comprising:

a communication module for receiving a radio resource availability level from a base station; and a controller for comparing the received radio resource availability level with an actual level of the mobile terminal to determine whether the radio resources are available to the mobile terminal, wherein the actual level of the mobile terminal is classified depending on types of service subscriptions, and wherein the mobile terminal performs cell reselection when the availability level indicating an unavailability of radio resources is received continuously over a time specified by a network operator.

5. A non-transitory computer-readable recording medium having recorded thereon a program for executing a method for managing radio resources in a mobile terminal, the method comprising:

receiving, by a first code segment, a radio resource availability level from a base station; and comparing, by a second code segment, the received radio resource availability level with an actual level of the mobile terminal to determine whether the radio resources are available to the mobile terminal, wherein the actual level of the mobile terminal is classified depending on types of service subscriptions, and wherein the mobile terminal performs cell reselection when the availability level indicating an unavailability of radio resources is received continuously over a time specified by a network operator.

6. A method for managing radio resources at a mobile terminal, comprising the steps of:

receiving a radio resource availability level from a base station;

comparing the radio resource availability level with an actual level of the mobile terminal to determine whether the radio resources are available to the mobile terminal; and informing a user of a possibility of a mobile origination call and a packet switching service depending on the availability of the radio resources, wherein the actual level of the mobile terminal is classified depending on types of service subscriptions, and wherein the mobile terminal performs cell reselection when the availability level indicating an unavailability of radio resources is received continuously over a time specified by a network operator.

7. The method of claim 6, further comprising receiving an available radio resource amount from the base station, when the radio resource availability level received.

8. The method of claim 7, wherein determining whether the radio resources are available to the mobile terminal further comprises:

detecting a pre-stored radio resource availability level of the mobile terminal based on the available radio resource amount; and comparing the detected radio resource availability level with the actual level of the mobile terminal to determine whether the radio resources are available to the mobile terminal.

9. The method of claim 5, wherein informing the user of the possibility of the mobile origination call and the packet switching service further comprises informing the user of the possibility of the mobile origination call and the packet switching service, when the radio resources are available to the mobile terminal.

10. The method of claim 9, further comprising informing the user of a temporary impossibility of the mobile origination call and the packet switching service, when the radio resources are unavailable to the mobile terminal.

11. The method of claim 5, wherein the radio resource availability level is included in a periodically-broadcasted system information message.

* * * * *